(12) United States Patent
Crudgington et al.

(10) Patent No.: US 10,149,533 B2
(45) Date of Patent: Dec. 11, 2018

(54) TUFT FORMING APPARATUS

(71) Applicant: CROSS MANUFACTURING COMPANY (1938) LIMITED, Bath (GB)

(72) Inventors: Peter F. Crudgington, Nr Bath (GB); Aaron Bowsher, Devizes (GB); Matthew Jenkins, Calne (GB); Mark Bolwell, Devizes (GB); Andrew Wallis, Bath (GB); Andrew Pawlak, Devizes (GB)

(73) Assignee: CROSS MANUFACTURING COMPANY (1938) LIMITED, Bath (GB)

( * ) Notice: Subject to any disclaimer, the term of this patent is extended or adjusted under 35 U.S.C. 154(b) by 403 days.

(21) Appl. No.: 14/443,443

(22) PCT Filed: Nov. 15, 2013

(86) PCT No.: PCT/GB2013/053009
§ 371 (c)(1),
(2) Date: May 18, 2015

(87) PCT Pub. No.: WO2014/076482
PCT Pub. Date: May 22, 2014

(65) Prior Publication Data
US 2015/0305488 A1    Oct. 29, 2015

Related U.S. Application Data

(60) Provisional application No. 61/736,091, filed on Dec. 12, 2012.

(30) Foreign Application Priority Data

Nov. 16, 2012 (GB) .................................. 1220687.6

(51) Int. Cl.
*A46D 1/04* (2006.01)
*A46D 1/06* (2006.01)
(Continued)

(52) U.S. Cl.
CPC .................. *A46D 1/08* (2013.01); *A46B 3/02* (2013.01); *A46D 1/04* (2013.01); *A46D 1/06* (2013.01);
(Continued)

(58) Field of Classification Search
CPC ... A46D 1/00; A46D 1/04; A46D 1/06; A46D 3/00; A46D 3/04; A46D 3/045; A46D 3/08; A46D 9/00; A46D 9/02
(Continued)

(56) References Cited

U.S. PATENT DOCUMENTS 2,672,640 A * 3/1954 Peterson .................. A46B 3/00
15/159.1
2,878,069 A * 3/1959 Wessel, Jr. ............. A46D 3/045
15/192

(Continued)

FOREIGN PATENT DOCUMENTS

GB    2022197 A    12/1979
GB    2201336      * 9/1988
(Continued)

OTHER PUBLICATIONS

Partial machine translation of JP 63-51908, dated Mar. 5, 1988.*

*Primary Examiner* — Mark Spisich
(74) *Attorney, Agent, or Firm* — King & Schickli, PLLC

(57) ABSTRACT

An apparatus (10) for forming multi-filament tufts for use in a brush seal includes a support (14) for retaining an end of a skein (16) of aligned wires or fibers and a glue reservoir (15) dimensioned to receive the skein end. The support (14) and the reservoir (15) being relatively movable whereby the (Continued)

end can be inserted in the glue reservoir (15) so that the adhesive can adhere the wires or fibers at the end to form the tuft. A cutter (13) is also provided for cutting the wires or fibers to length after the wires and fibers are retained by the support (14).

9 Claims, 3 Drawing Sheets

(51) Int. Cl.
*A46D 3/04* (2006.01)
*A46D 3/08* (2006.01)
*A46D 1/08* (2006.01)
*A46B 3/02* (2006.01)
*F16J 15/3288* (2016.01)

(52) U.S. Cl.
CPC ............... *A46D 3/045* (2013.01); *A46D 3/08* (2013.01); *F16J 15/3288* (2013.01)

(58) Field of Classification Search
USPC .................................. 300/2, 4, 5, 6, 7, 8, 21
See application file for complete search history.

(56) References Cited

U.S. PATENT DOCUMENTS

| | | | |
|---|---|---|---|
| 4,274,575 A | 6/1981 | Flower | |
| 4,934,759 A | 6/1990 | Bridges | |
| 4,954,305 A | 9/1990 | Weihrauch | |
| 5,033,797 A * | 7/1991 | Rueb | A46D 3/045 |
| | | | 300/21 |
| 5,165,758 A | 11/1992 | Howe | |
| 5,183,197 A | 2/1993 | Howe | |
| 2003/0094848 A1 | 5/2003 | Shia | |
| 2004/0048063 A1* | 3/2004 | Brown, Jr. | A46D 1/08 |
| | | | 428/364 |
| 2007/0079493 A1 | 4/2007 | Couture et al. | |
| 2011/0057501 A1* | 3/2011 | Chee | B08B 9/055 |
| | | | 300/21 |

FOREIGN PATENT DOCUMENTS

| | | | |
|---|---|---|---|
| JP | 63-51908 | * | 3/1988 |
| JP | S63317103 A | | 12/1988 |
| JP | H09505496 | | 6/1995 |
| RU | 2389927 C1 | | 5/2010 |
| SU | 1756702 A1 | | 8/1992 |

* cited by examiner

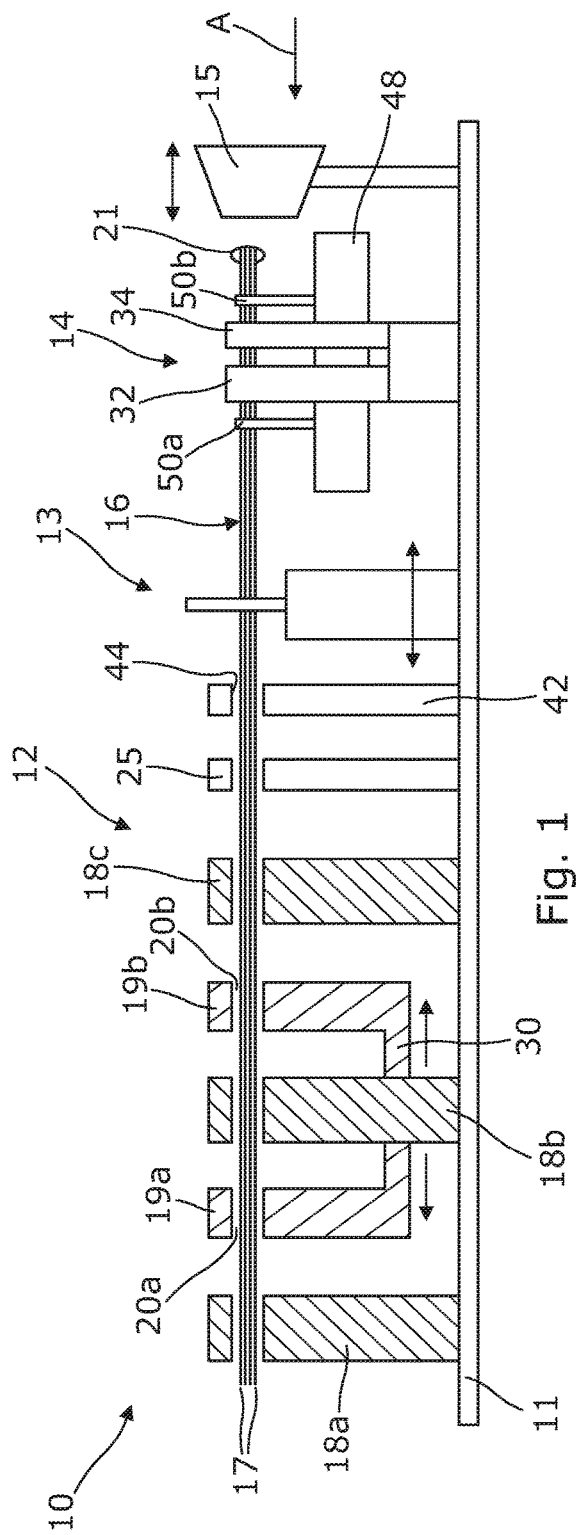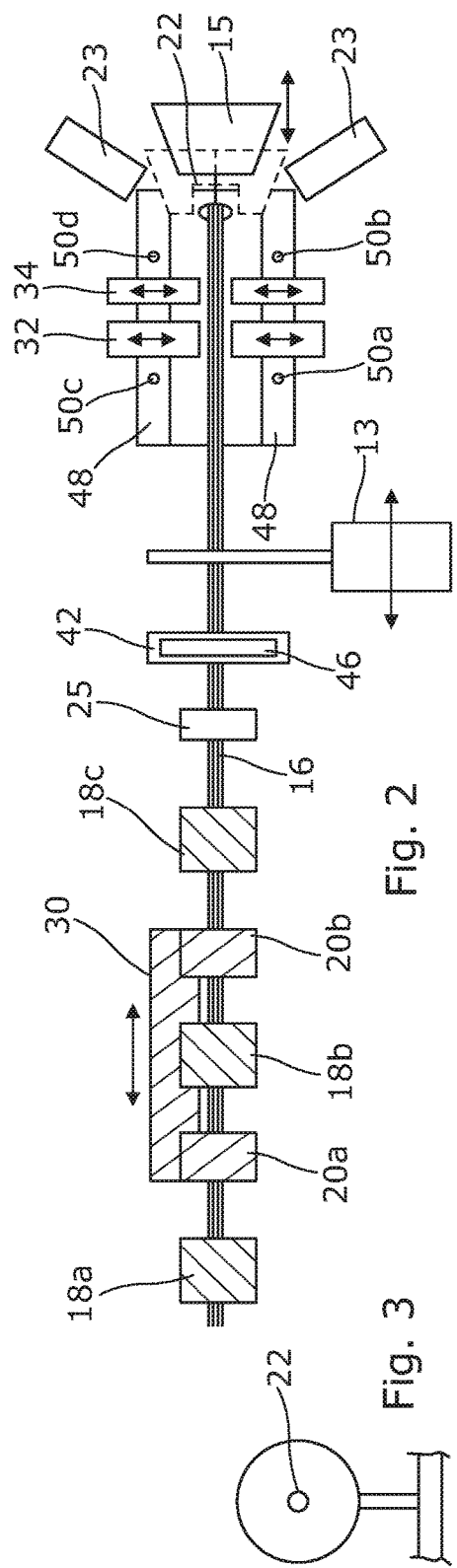

TUFT FORMING APPARATUS

CROSS REFERENCE TO RELATED APPLICATIONS

This application is the national stage of International Application No. PCT/GB2013/053009, filed Nov. 15, 2013, which claims priority of U.S. Provisional Application No. 61/736,091, Filed Dec. 12, 1012 and claims benefit of Great Britain Application No. 1220687.6, filed Nov. 16, 2012.

FIELD OF THE INVENTION

This invention relates to apparatus for forming bristle tufts for use in a brush seal.

BACKGROUND OF THE INVENTION

Brush seals incorporate a large number of bristles (which comprise aligned wires or fibres) which are generally held at one end and free at the other. One known method of manufacture of such brush seals is to produce a tuft (or bundle) comprising a known number of bristles which are temporarily held together by some means. During subsequent manufacturing processes the individual tufts are placed between the front and back plates to form a brush seal. Once the brush seal has been assembled the temporary means of holding the tufts together is removed by an appropriate method to provide a uniform brush seal with a known number of bristles.

SUMMARY OF INVENTION

The present invention consists in apparatus for forming multi-filament tufts for use in a brush seal including a support for retaining an end of a skein of aligned wires or fibres and an adhesive reservoir dimensioned to receive the skein end, the support and reservoir being relatively movable whereby the end can be inserted in the adhesive reservoir so that the glue can adhere the wires or fibres at the end to form the tuft and a cutter for cutting the wires or fibres to length after the wires or fibres are retained by the support.

Thus, embodiments of the invention are arranged to provide a tuft where the wires or fibres are held at one end and free at the other. This is advantageous over existing manufacturing methods where the bristles are typically held together along their entire length. Embodiments of the invention provide an improved automated method of manufacture and provide improved tuft filament retention. Thus, embodiments of the invention may reduce or obviating the reliance upon the presence of a skilled operator.

The term "skein" in this specification refers to a multi-filament length of wires and fibres in which the wires or fibres are aligned.

The cutter may be for cutting the skein before, after or during adhering. The cutter may typically be arranged to cut the skein to the required length while the skein is held stationary by the support.

The support may be fixed and the reservoir may be moveable relative to the support. This is advantageous in that it enables the apparatus to align, support, grip and form the end of a stationery skein of wires prior to them being bonded together in a controlled and repeatable way by immersion into an aligned and moveable adhesive reservoir/ reservoir guide. Excess adhesive may be wiped from the skein on retraction of the reservoir/support. For example, excess adhesive may be wiped from the skein by the aperture of the reservoir.

The support may comprise a clamp. The, or each, clamp may be arranged to grip the skein. The clamp may be provided by opposed jaws. For example, the jaws may be arranged to be relatively movable in a direction which is substantially perpendicular to the longitudinal axis of the skein. One or both jaws may be provided with a notch arranged to receive and align the skein. In the closed position, the notch or notches may define an aperture in which the skein is held. The jaws may be arranged to overlap in the closed position and may, for example, be provided with interlocking profiles.

The support may comprise a plurality of clamps. Each clamp may define a different aperture in the closed position. For example, a first clamp may be arranged to generally gather the filaments of the skein into close alignment and a second clamp may be arranged to clamp the filaments to a desired cross-sectional size and/or shape.

The reservoir has an aperture for receiving the skein end and the aperture is up to 50% larger in cross section than the end. The skein may be retained aligned substantially parallel with an axis, in which case the reservoir may face along the axis. Alternatively, the reservoir may extend substantially vertically and the support may be rotatable through substantially 90° for inserting the end in the reservoir.

One or more radiant lamps may be provided for curing the adhesive applied to the end. The radiant lamps may be provided on the apparatus and may, for example be provided on the support.

The apparatus may further include a mechanism for advancing the skein of parallel wires or fibres to the support. For example the apparatus may include a mechanism for advancing the skein along its axis. Control means may be provided for intermittently advancing the skein after each formed tuft is released by the support.

The cutter may be movable along the longitudinal axis of the skein. As such, the length of the cut tuft may be adjustable. The cutter may also be moveable vertically and horizontally to facilitate optimum cutter to skein alignment.

The invention includes a tuft manufactured by the apparatus. The wires may be metal. The fibres may be any non-metallic fibres including carbon fibres.

Although the invention has been defined above it includes any inventive combination of the feature set out above or in the following description.

BRIEF DESCRIPTION OF THE DRAWINGS

The invention may be performed in various ways and specific embodiments will now be described, by way of example with reference to the accompanying drawings in which;

FIG. 1 is a schematic side view of tuft forming apparatus;

FIG. 2 is a plan view of the apparatus of FIG. 1;

FIG. 3 is an end view of a glue head of the apparatus of FIG. 1 taken on the arrow A;

DETAILED DESCRIPTION OF EMBODIMENTS

Figure 5:
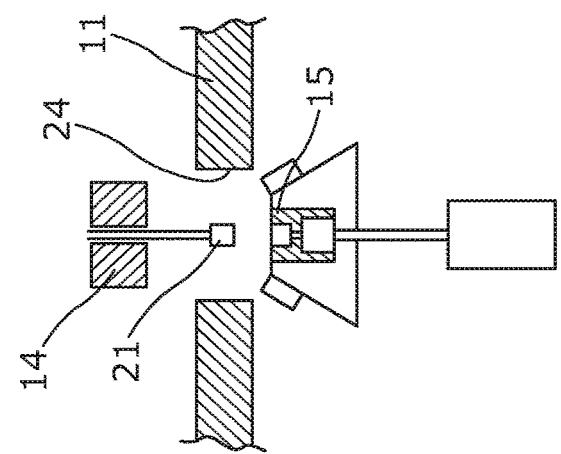
FIG. 5 is a schematic cross section through FIG. 4 on the line IV-IV.

A tuft forming apparatus is generally indicated at 10. It comprises a base plate 11, an advancing mechanism generally indicated at 12, a cutter mechanism 13, a support 14 and a glue head 15. Elements 12 to 15 are spaced along a path for a skein 16. The elements 12 to 15 are generally aligned about a common axis along which the skein is retained in use. In particular, the skein engaging portions of the advancing mechanism 12, support 14, glue head 15 are concentric about said common axis.

The skein is typically formed from a plurality of aligned filaments, the particular material being selected in accordance with the environment in which the particular brush seal is intended to be used. It could equally be formed of aligned fibres or yarns of non-metallic materials such as carbon fibre. In general the wires or fibres will be parallel. Individual wires or fibres are designated 17 but it will be appreciated that in the practical embodiment there would be a significant number of wires per tuft.

The advancing mechanism 12 comprises guide supports 18 and gripper heads 19. The gripper heads 19 have jaws, generally indicated at 20 that can grip and release the scheme 16. The gripper heads 19a, 19b are moveable relative to the guide supports 18a, 18b, and 18c. The gripper heads 19a, 19b may be connected to a parallel slide gripper table 30 to actuate the movement of the gripper heads 19 in unison. In use, the gripper heads may be arranged to engage the skein by closing the gripper jaws 20 before translating to advance the skein 16 in a direction towards the glue head 15. The gripper jaws 20 release the skein 16 at the end of their translation before the gripper heads 19a and 19b return to their original position, during which movement the skein 16 is supported by the guide supports 18. A fixed gripper 25 is also provided which grip the skein after the translation of gripper heads 20 so as to prevent any unintended reverse movement of the skein 16 while the gripper heads return to their start position. Additionally (as described in further detail below) the skein 16 may be engaged by the support 14. The translation of the gripper heads 19 may be arranged such that a single movement of the heads translates the skein by the distance required to form a single tuft.

In an alternative arrangement, the gripper heads 19a and 19b may be relatively movable along the path so that, for example, jaws 20a of gripper head 19a shut and the jaws 20b of the gripper head 19b open the gripper head 19a can be traversed from left to right advancing the skein 16 through the open jaws 20b of the gripper head 19b. Those jaws 20b then close and the jaws 20a of gripper head 19a open for it to return to its initial position. In this way the skein 16 is advanced by the distance between the gripper heads 19a, 19b. This will conveniently be approximately the length of the intended tuft. The guide supports 18 may optionally be omitted in such an arrangement.

The cutter mechanism 13 can in its most simple form be a pair of mechanical scissors but it could be a laser or other appropriate cutting device. Somewhat surprisingly, the applicants have found that a mechanical cutting mechanism is most effective avoiding any undesirable welding of individual fibres in the tuft. As will be explained below, the cutter 13 cuts the skein 16 at an appropriate moment to cut the wires 17 to length for the tuft.

The cutter mechanism 13 may be relatively moveable with respect to the support 14 to enable the tuft length to be adjusted. Advantageously, this may allow the tuft length to be adjusted without the need to move the skein 16 (which may reduce the chance of misalignment of the fibres). An alignment block 42 may be provided proximal to the cutter mechanism 13 to support and/or align the skein 16 at the cutting location. The block 42 is provided with an aperture 44 through which the skein 16 is threaded. The block may also be provided with a slot 46 for receiving an insert (not shown). The insert is provided with an aperture which is aligned with (and typically coaxial with) the aperture 44 when positioned within the slot 46. Thus, the slot and insert may be used to quickly reconfigure the alignment block 42 to receive different sized and/or shaped skeins 16.

Figure 6:
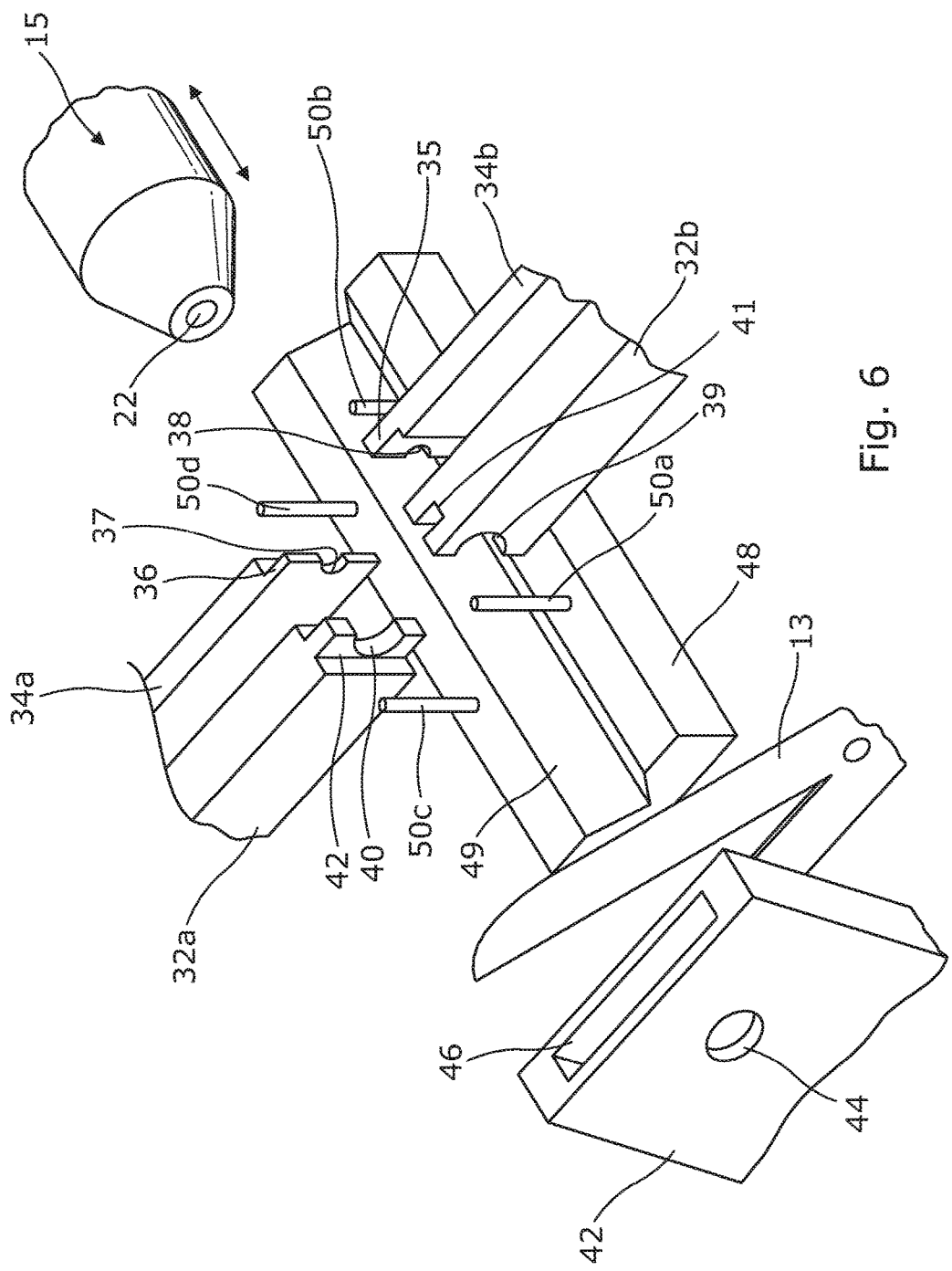
FIG. 6 is a schematic 3 dimensional view of a cutter, support and glue head for use in embodiments of the invention.

The advanced skein 16 moves into openable and closable jaws of the support 14 whereby the end 21 of the skein 16 projects to the right hand side of the support 14. As best seen in FIG. 6, the support 14 may be provided with a multi stage clamping arrangement for holding the skein 16. A first clamp 32 may be provided to gather together and retain the fibres of the skein while a second shape clamp 34 may be arranged to more tightly form the skein 16 into the desired cross-sectional size and/or shape of tuft prior to the gluing of the skein end 21. Both clamp 32 and shape clamp 34 are provided with end profiles which are arranged to engage the skein. The end profiles comprise opposed pairs of notches 39 and 40, 37 and 38 which in the closed position form an aperture within which the skein 16 will be retained. The aperture formed by the notches 39 and 40 of the clamp 32 is preferably of a larger diameter than that formed by the notches 37 and 38 of the shape clamp 34. To ensure that the jaws of the clamps 32, 34 align correctly they may also be provided with interlocking end profiles. In the example of FIG. 6, the interlocking features of the clamp 32 comprise a tab 42 on a first clamp member 32a and a complementary recess 41 in the opposing clamp member 32b. The shape clamp 34 is provided with interlocking features in the form of stepped opposing recesses 35 and 36 on the respective clamp numbers 34a and 34b such that, in the closed position, the jaws may overlap (in the manner of a lap joint). During actuation the clamp 32 is arranged to lead the shape clamp 34 such that its ends meet the skein 16 before those of the shape clamp 34. In one particular embodiment the clamp 32 and shape clamp 36 are actuated by a common actuation mechanism and the ends of the clamp 32 may be resilient such that they can be compressed after closing to allow for subsequent movement of the actuation mechanism to close the shape clamp 34. For example, the clamp 32 may be mounted via a spring to the actuation mechanism.

The glue head 15 has an open ended adhesive reservoir 22 facing the end 21 and aligned therewith for receiving the end 21. This can be achieved by either moving the support 14 or the glue head 15 or both. In the plan view, the glue head 15 has moved into an adhering position as indicated in broken line in which the end 21 lies in the reservoir 22 and becomes coated with adhesive. If the support 14 is to move, then the skein 16 would need to be cut prior to that movement and the support 14 would have to move from right to left to pick up the skein again. Alternatively both jaws 20 could be opened allowing the skein to be pulled through, in which case gripper heads 18 and 19 could be spaced nearer together.

Radiant lamps 23, which may be conveniently ultraviolet, are positioned for curing the adhesive applied to the end 21 by the glue head 15. When the adhesive is cured and the skein cut, the jaws of the clamps 32 and 34 of the support 14 release the tuft such that it falls into a locating cradle 48 which may for example be provided with a recess 49, for example a v-shaped recess, to accurately locate the tuft. The tuft may subsequently be removed from the cradle 48 by a suitable automated mechanism. In order to ensure that the tuft is accurately released from the jaws of the support 14 into the cradle 48, upstanding wiper pins 50 may be provided. Each pin is located to the side of the skein 16 and extends upward from the cradle 48 to an end which is above the vertical position of the skein. In the open position at least the notches 39 and 40, 37 and 38 of the jaws of the clamp 32 and 34 move beyond the pins 50 in their actuation direction (transverse to the longitudinal axis of the skein 16). After removal from the cradle 48 the resultant tuft can be placed in a former or cassette for subsequent manufacture into a brush seal.

Figure 4:
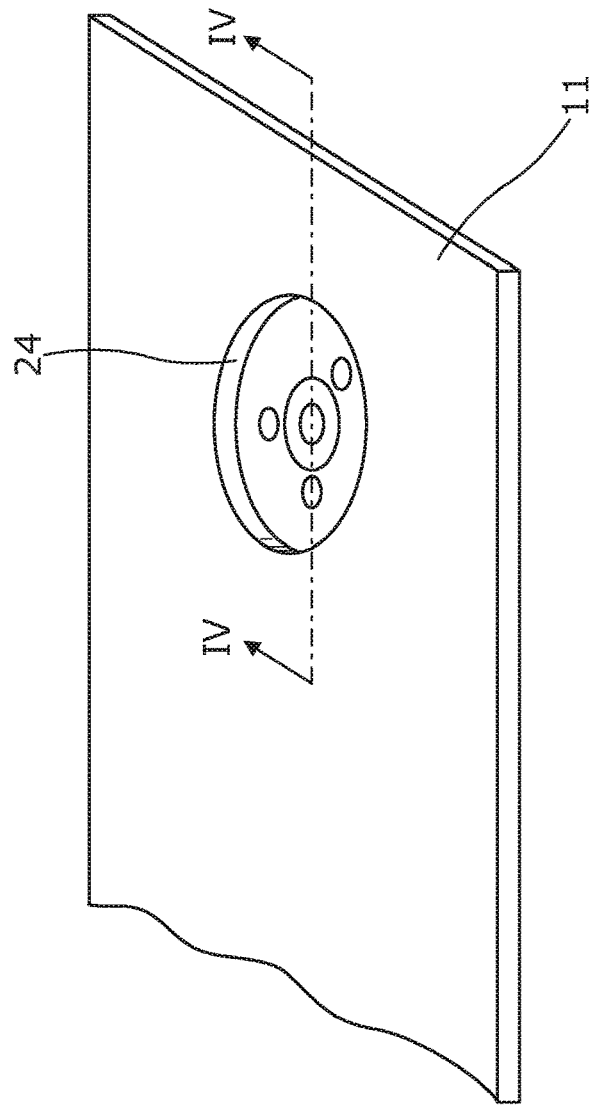
FIG. 4 is a view from above on one side of an alternative glue head arrangement.

FIGS. 4 and 5 show an alternative embodiment. In this case the glue head 15 is located beneath an opening 24 in the base plate 11. It is mounted on the shaft of a ram so that the glue head can be raised and lowered relative to the base plate 11. In this case the support 14 is mounted to rotate through substantially 180° so that the end 21 can be presented to the glue head. This arrangement has the advantage of making it less likely that adhesive will drip.

The size of the opening of the reservoir 22 will to a great extent define the size of the end of the tuft. It is therefore preferred that this opening is not more than 50% greater in cross section than the end of the tuft.

Although the invention has been described above with reference to one or more preferred embodiments, it will be appreciated that various changes or modifications may be made without departing from the scope of the invention as defined in the appended claims.

The invention claimed is:

1. Apparatus for forming multi-filament tufts for use in a brush seal including a support for retaining an end of a skein of aligned wires or fibres and a glue reservoir dimensioned to receive the skein end, the support and the reservoir being relatively movable whereby the end can be inserted in the glue reservoir so that the adhesive can adhere the wires or fibres at the end to form the tuft and a cutter for cutting the wires or fibres to length after the wires and fibres are retained by the support; and wherein the reservoir has an aperture for receiving the end and the aperture is up to 50% larger in cross section than the end.

2. Apparatus as claimed in claim 1 wherein the cutter is for cutting the skein before, after or during adhering.

3. Apparatus as claimed in claim 1 wherein the skein is retained aligned substantially parallel with an axis and the reservoir faces along the axis.

4. Apparatus as claimed in claim 1 wherein the reservoir extends substantially vertically and the support is rotatable through substantially 90° for inserting the end in the reservoir.

5. Apparatus as claimed in claim 1 further including one or more radiant lamps for curing the adhesive applied to the end.

6. Apparatus as claimed in claim 1 including a mechanism for advancing the skein of parallel wires or fibres to the support.

7. Apparatus as claimed in claim 1 wherein the support comprises at least one clamp.

8. Apparatus as claimed in claim 7 wherein the support comprises a first clamp, arranged to gather the filaments of the skein into close alignment, and a second clamp, arranged to clamp the filaments in a predetermined cross-sectional size and/or shape.

9. Apparatus as claimed in claim 1 wherein the cutter is moveable along the longitudinal axis of the skein.

* * * * *